United States Patent Office 2,788,320
Patented Apr. 9, 1957

2,788,320

PESTICIDAL COATING COMPOSITIONS

Paul Bracey, London, England, assignor to National Research Development Corporation, London, England, a British corporation No Drawing. Application July 15, 1953,
Serial No. 368,207

Claims priority, application Great Britain July 16, 1952

8 Claims. (Cl. 204—158)

This invention relates to film-forming coating compositions having pest-controlling properties, the term "pest" being understood as including not only insects but also crustacea and microorganisms such as, for example, fungi or bacteria.

Specification No. 2699/51 describes and claims pesticidal coating compositions which are prepared by dissolving or bringing together in a lacquer solvent a plasticised organic-solvent soluble aminoplastic resin together with a pesticide consisting of one or more organic solvent soluble substances toxic to pests in a quantity sufficient to exhibit the effect of crystallisation, exudation or evaporation of the pesticide at or from the surface of a film derived from the composition and adding to the composition before use an acidic hardening agent or accelerator capable of effecting at ordinary prevailing atmospheric temperatures gelatinization of the lacquer solution or of the lacquer film remaining after evaporation of the solvent. When applied to a wall or other surface, such compositions set to form a durable film having the characteristic that the pesticide contained therein, according to its nature, either crystallises on the surface of the film to form a fine bloom thereon or slowly exudes or evaporates therefrom. Thus the pesticide is released at a slow rate from the film which, however, can retain a quantity sufficient to endow it with pesticidal qualities for a long period of time.

The rate at which the pesticide is released from the film depends on the hardness of the outer surface of the film, being greater the less the surface hardness. In the compositions according to the aforesaid specification, the hardening of the film is brought about by the acidic hardening agent or accelerator and is controlled by the proportion of plasticiser to resin.

Although it is frequently desirable, especially when the more volatile pest-controlling substances are used, to reduce the rate at which the substance is released, the difficulty arises that a film with the necessary degree of hardness to bring this about is often unsatisfactory qua film in that it is lacking in elasticity and other desirable characteristics. I have found, however that it is possible to increase and control the surface hardness of an aminoplastic resin film without materially affecting its interior, to give a desired rate of release of the pesticide, by irradiating the film with ultra-violet radiation.

According to the invention, therefore, the hardness of a film produced from a coating composition comprising a lacquer solvent and an organic-solvent soluble aminoplastic resin together with an organic-solvent soluble pest-controlling substance in a quantity sufficient to exhibit the effect of crystallisation, exudation or evaporation on or from the surface of the film, is controlled by irradiating the surface of the film with ultra-violet radiation.

The invention is especially useful when applied to coatings in which the pest-controlling substance, owing to its nature or the quantity in which it is present in the film, is released at a rate greater than that necessary to deal with the pests to which it is likely to be subjected. Thus, it is possible with a given rate of release to store a greater quantity of pest-controlling substance in the film, and it is also possible greatly to increase the useful life of a film containing a pest-controlling substance which, owing to its volatility or the smallness of its molecule, would otherwise be released too rapidly. The invention also enables substances which are unstable to light or air to be stored in the film for long periods of time, small quantities being slowly released on or from the surface of the film. Such a substance, for instance, is pyrethrin.

The hardening treatment may be assisted by heating, in which case the temperature to which the film is raised may be of the order of from 60° C. to 100° C. It will be understood, however, that the temperature must not be sufficient to decompose or volatilise a substantial part of the pest-controlling substance present in the film. Where the pest-controlling substance is volatile or liable to decompose on heating and the hardening of the aminoplastic film cannot, therefore, be accelerated by heating, it is necessary to rely entirely on ultra-violet radiation. A particularly advantageous application of ultra-violet irradiation alone is to films containing the insecticide gamma benzene hexachloride.

It is preferable to use radiation in the short-wave length region, for example in the region of 2500 Angstrom units, and is conveniently obtained by means of a mercury vapour lamp. The degree of hardening depends on the intensity and duration of the radiation incident on the surface. Thus, for example, a marked effect may be obtained after irradiating for ½ hour, and the hardness is increased as the irradiation time is increased until a limit after, say, 8 hours is reached, at which further irradiation has no further effect. The ultra-violet irradiation affects only the outer surface of the film, with the result that those characteristics of the film that are not determined by its outer surface or skin remain substantially unaffected.

In carrying out the invention, the coating composition is applied to the surface to be protected, for example the cabin of an aeroplane or the surface of a factory made article such as furniture, by any convenient means, for instance painting or spraying. When the coating has dried and (where an acid accelerator is present) hardened, it is irradiated with ultra-violet radiation, for example by means of a suitable lamp, for a time sufficient to reduce the rate of but not inhibit the release of pesticide by crystallisation, exudation or evaporation. The film may be subjected to additional heat treatment if this is desirable, by infra-red radiation or by means of hot air, for example in a stove or oven. An advantageous property of the films treated by the invention is that they repeatedly replenish the supply of pesticide released on or from the surface, even after repeated cleaning or washing of the film. In fact the disturbance of the surface due to such operations, as also to contact with an insect, stimulates the release of the pesticide.

Examples of organic-solvent soluble aminoplastic resins suitable for use in the invention are resins derived from the condensation of urea and/or melamine with formaldehyde in the presence of alcohols by well known processes, and particularly suitable resins are those derived from the condensation of urea, formaldehyde and butyl alcohol, specific examples being resins of the above formulation and manufacture known by trade references as Beetle Resin BE.610 "Beetle" being a registered trademark.

It is generally desirable to include in the composition a plasticiser to control and regulate the hardness of the film. Any of the well known plasticisers ordinarily used for the improvement and modification of the film and film-forming properties of the above resins may be used. Examples of suitable plasticisers are, castor oil, tricresyl phosphate and plasticising alkyd resins of short or medium oil length. Particularly suitable plasticising alkyd resins of the above formulation based on non-drying oils such as castor oil, are those known by trade references as Beetle Resins BA.502 "Beetle" being a registered trademark.

"Short oil" drying oil alkyd resins normally used for stoving finishes may also be used in conjunction with the aminoplastic resins if desired, the alkyd resin thereby acting as both plasticiser and solid film forming agent together with the aminoplastic resin. One or more of any such plasticisers may be used in conjunction with one or more of the resins described above.

The proportions of plasticiser used per unit quantity of aminoplastic resin may be varied within reasonably wide limits and will in any case vary among individual plasticisers according to their individual properties. Suitable proportions based on specific materials described above may range from 0.25 to 4.0 parts by weight of Resin BA.502 per 1 part by weight of Resin BE.610. When other resins or other plasticisers are used the relative proportions may be adjusted so as to yield films of generally comparable properties to those exemplified above.

Plasticised aminoplastic resins similar to those produced by the addition of a plasticiser to an already formed aminoplastic resin may be obtained by the union of a partially condensed and partially alkylated aminoplastic resin with a partially polymerised and condensed alkyd resin or the components thereof (see, for example, British patent specification No. 344,401).

The pest-controlling substance may be one which is toxic to pests or which attracts or repels them.

Examples of suitable pesticidal compounds are:

(a) Gamma benzene hexachloride.
(b) Dichloro-diphenyl-trichloroethane.
(c) 1,2,3,4,10,10 hexachloro-1,4,4a,5,8a hexahydro-1,4, 5,8 di-endo-methano-naphthalene, and
(d) 1,2,3,4,10,10 hexachloro-6,7 epoxy-1,4,4a,5,6,7,8,8a, octahydro-1,4,5,8 dimethano-naphthalene.
(e) Dl - 2-allyl - 4 - hydroxy-3-methyl cyclopenten-2-one esterified with a mixture of cis and trans dl-chrysanthemum monocarboxylic acid.
(f) Organic mercury compounds.
(g) Dinitro-o-cresol
(h) Ethyl mercuric thiocyanate
(i) Lactic acid
(j) Pyrethrin with or without a synergist such as piperonyl butoxide.

Examples of attractants and repellants are:

(a) Dimethyl phthalate for repelling insects.
(b) Isovaleric acid for attracting insects.
(c) Quassia for repelling rabbits and rodents.

These substances need not be in a high state of purity and if desired may be used in admixture. For example an insect attractant and an insecticide may be combined. Commercial materials incorporating the above substances and known respectively by the trade references (a) Gammexane, (b) DDT, (c) Aldrin, (d) Dieldrin and (e) Allethrin may be employed; Gammexane being a registered trademark and Aldrin and Dieldrin being names adopted by the Interdepartmental Commission on Pest Control of U. S. Department of Agriculture (Chem. Abstracts XLIV 1950 p. 7009). Allethrin is also a name adopted by the Interdepartmental Commission on Pest Control of U. S. Department of Agriculture.

It is generally necessary, when the hardening of the surface is to be effected by ultra-violet radiation without application of heat, to include in the composition an acid accelerator, which is normally added shortly before use. This is due to the fact stated above that the ultra-violet radiation affects only the outer skin of the film. Examples of suitable accelerators capable of effecting gelatinisation and hardening of the lacquer film or body remaining after evaporation of the solvents are acids such as sulphuric acid, hydrochloric acid, ethyl-sulphuric acid, and phosphoric acid, which are soluble and stable in alcoholic solvents. The preferred acids are those having a dissociation constant approximately equal to or greater than that of phosphoric acid.

The concentration of the solution of hardening agent and the proportion of hardening agent to be used may be varied for adjustment of the working life of the accelerated lacquer and drying or hardening time of the final coatings, the use of smaller proportions of acids favouring longer working life and slower hardening rates. In the case of lacquers based on plasticised solvent soluble urea formaldehyde resins suitable proportions of hardening agent may range from 0.2% by weight of a strong acid such as sulphuric acid on the total dry weight of resin and plasticizer or 1% to 6% by weight of weaker acids such as phosphoric acid. In general the strongest acids and the higher proportions will be used in lacquers based on solvent soluble melamine-formaldehyde resins or a proportion thereof as an ingredient of the aminoplastic resin.

The lacquer solvents may comprise esters, aliphatic and aromatic hydrocarbons, ketones, ethers and alcohols, but in general a proportion of not less than 20% by weight of the total solvents should consist of a primary alcohol such as n-butyl alcohol to provide good storage stability. For a constant proportion of hardening agent a higher proportion of primary alcohol in the lacquer solvents will lengthen the working life of the accelerated lacquer.

Fillers, pigments or dyestuffs may be incorporated in the coating compositions if desired.

The following examples illustrate the invention:

*Example 1*

3 parts by weight of gamma benzene hexachloride were dissolved with stirring in a blend of 100 parts by weight of Beetle Resin BE.610 comprising approximately 60 parts by weight of butylated urea formaldehyde resin in n-butanol solution, 100 parts by weight of Beetle Resin BA.502 comprising approximately 60 parts by weight of a castor oil modified alkyd resin in xylol solution and 100 parts by weight of mixed lacquer solvents comprising 55 parts by weight of n-butanol and 45 parts by weight of xylol.

10 parts by weight of a solution comprising 1 part by weight of sulphuric acid and 9 parts by weight of n-butanol were mixed into 162 parts of the above lacquer. The air drying pesticidal coating composition so prepared was sprayed whilst still fluid on to a number of tinplate panels and the lacquer films were dried in air at room temperature (60° F.–70° F.) The films were allowed to harden and were then irradiated for various lengths of time with ultra-violet light having a wave-length of about 2500 Angstrom units. After irradiation and ageing for 1 day, house flies were imprisoned on each panel under Petri dishes, and the time taken for a 95% knock-down was determined. The results are shown in the following table:

| U. V. exposure period | Age | 95% knock-down after– |
|---|---|---|
| | Day | Minutes |
| 0 | 1 | 35 |
| ½ hour | 1 | 60 |
| 1 hour | 1 | 90 |
| 2 hours | 1 | 165 |
| 8 hours | 1 | 340 |
| 16 hours | 1 | 340 |
| 24 hours | 1 | 340 |

After allowing the films to age for a further 5 days at 25° C. and a relative humidity of 70%, and lightly sandpapering the surface of the three films exposed to ultra-violet light for 8, 16 and 24 hours, the tests were repeated with the following results:

| U. V. exposure | Treatment | Age | 95% knockdown of flies after— |
|---|---|---|---|
| | | Days | Minutes |
| 0 | none | 6 | 30 |
| ½ hour | do | 6 | 60 |
| 1 hour | do | 6 | 85 |
| 2 hours | do | 6 | 160 |
| 8 hours | sand-papered | 6 | 35 |
| 16 hours | do | 6 | 40 |
| 24 hours | do | 6 | 40 |

The tests on the sand-papered films show clearly that the hardening effect of the irradiation is limited to the outer skin of the film.

*Example 2*

The pesticide used in Example 1 was replaced by a 20 parts by weight of mixture of 3 parts of pyrethium and 24 parts of piperonyl butoxide.

I claim:

1. A method of controlling the rate of release of pest-controlling substance from a film produced from a coating composition comprising a lacquer solvent and an organic solvent-soluble aminoplastic resin and plasticizer therefor, together with an organic solvent-soluble pest-controlling substance in a quantity sufficient to exhibit its function at the surface of the film, which comprises skin hardening the surface of the film without materially affecting the interior thereof by irradiating said film with ultra-violet radiation.

2. A method according to claim 1 in which the said aminoplastic resin is selected from the group consisting of butylated urea formaldehyde and butylated melamine formaldehyde resins.

3. A method according to claim 1 in which the said aminoplastic resin is plasticised by the addition thereto of an oil modified alkyd resin.

4. A method according to claim 1 in which the film is produced with the aid of heat.

5. A process for producing a pest-controlling film upon a surface according to which the said surface is coated with a plasticised organic solvent-soluble aminoplastic resin dissolved in a lacquer solvent together with a pest-controlling substance in the solvent and an acidic hardening agent, the pest-controlling substance being present in a quantity sufficient to exhibit its function at the surface of the film eventually formed, drying the coating applied to the surface, allowing the dried coating to harden by ageing under the influence of the hardening agent, and irradiating the surface with ultra-violet radiation for a time sufficient to skin-harden the surface of the coating without materially affecting its interior to reduce the rate of, but not inhibit, the release of pest-controlling substance.

6. A method according to claim 1 in which the coating is hardened before exposure to ultra-violet radiation.

7. A method according to claim 6 in which the pest-controlling substance is heat sensitive and the hardening before exposure to ultra-violet radiation occurs at a temperature below that at which the pest-controlling substance would be substantially lost.

8. A method according to claim 1 in which the coating is applied to a wall.

References Cited in the file of this patent

UNITED STATES PATENTS

| 1,975,959 | Lawson et al. | Oct. 9, 1934 |
| 2,282,988 | Creely | May 12, 1942 |
| 2,515,107 | Amick | July 11, 1950 |